United States Patent
Kontorinis et al.

(10) Patent No.: US 11,264,803 B1
(45) Date of Patent: Mar. 1, 2022

(54) LOAD IMBALANCE MITIGATION WITH COMPONENT REPOSITIONING FOR HIGHER POWER SUBSCRIPTION IN WAREHOUSE SCALE COMPUTERS

(71) Applicant: Google LLC, Mountain View, CA (US)

(72) Inventors: Vasileios Kontorinis, Mountain View, CA (US); Dustin Reishus, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/242,915

(22) Filed: Apr. 28, 2021

(51) Int. Cl.
| | | |
|---|---|---|
| *G06F 1/18* | (2006.01) | |
| *H02J 3/28* | (2006.01) | |
| *H02J 3/14* | (2006.01) | |
| *H02J 1/14* | (2006.01) | |
| *G06F 1/26* | (2006.01) | |

(52) U.S. Cl.
CPC ............... *H02J 3/28* (2013.01); *G06F 1/189* (2013.01); *G06F 1/263* (2013.01); *H02J 1/14* (2013.01); *H02J 3/14* (2013.01); *H02J 2310/16* (2020.01)

(58) Field of Classification Search
CPC ........ H02J 3/28; H02J 3/14; H02J 1/14; H02J 2310/16; G06F 1/263; G06F 1/189
See application file for complete search history.

(56) References Cited

U.S. PATENT DOCUMENTS

| | | | |
|---|---|---|---|
| 9,218,033 B1 | 12/2015 | Roy et al. | |
| 2011/0245988 A1* | 10/2011 | Ingels | H02J 3/14 700/295 |
| 2015/0106578 A1 | 4/2015 | Warfield et al. | |
| 2019/0012909 A1 | 1/2019 | Mintz | |

FOREIGN PATENT DOCUMENTS

WO 2009032097 A1 3/2009

OTHER PUBLICATIONS

Peng Li, et al., Optimal Operation of Soft Open Points in Active Distribution Networks Under Three-Phase Unbalanced Conditions, IEEE Transactions on Smart Grid, vol. 10, No. 1, Jan. 2019, pp. 380-391.

Mayank Mishra, et al., On Theory of VM Placement: Anomalies in Existing Methodologies and Their Mitigation Using a Novel Vector Based Approach, published in 2011 IEEE 4th International Conference on Cloud Computing, 8 pages.

Xin Wu, et al., NetPilot: Automating Datacenter Network Failure Mitigation, SIGCOMM'12, Aug. 13-17, 2012, Helsinki, Finland, 12 pages.

Thomas F. Wenisch, et al, Power Routing: Dynamic Power Provisioning in the Data Center, Conference Paper in ACM SIGPLAN Notices • Mar. 2010, 13 pages.

* cited by examiner

*Primary Examiner* — Daniel Cavallari
(74) *Attorney, Agent, or Firm* — Lerner, David, Littenberg, Krumholz & Mentlik, LLP

(57) ABSTRACT

Current imbalance may be detected and components reactively moved to correct the current imbalance. The components, such as rectifiers, machines, etc., may be moved from the most loaded phase to the least loaded phase. The imbalance may be detected at one or more power distribution units. Rebalancing may be performed using a model which preserves the number of components per rack, while limiting per-rack phase imbalance and minimizing imbalance among phases. Once the rebalancing has been computed, instructions for moving components according to the rebalancing may be generated.

20 Claims, 7 Drawing Sheets

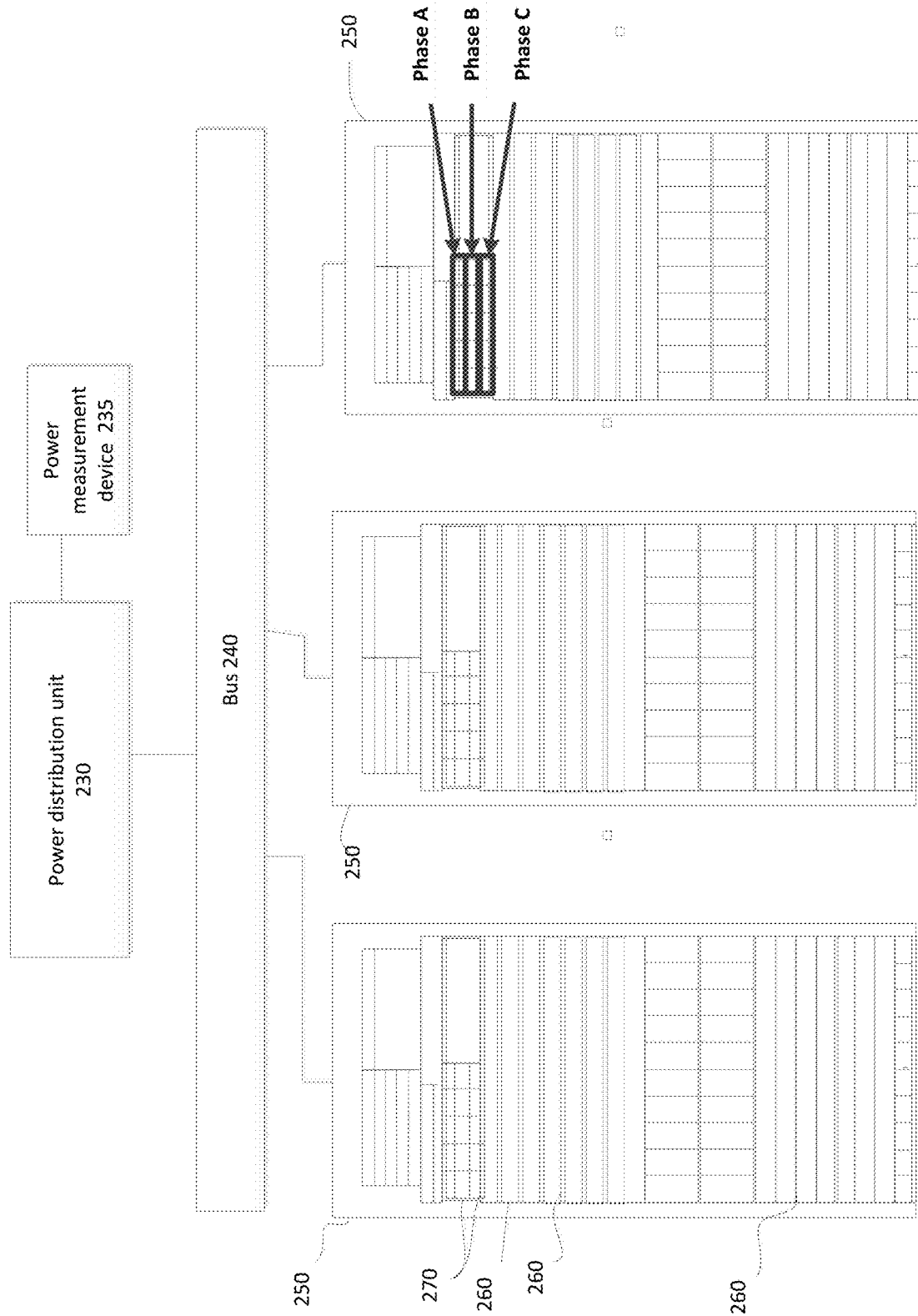

LOAD IMBALANCE MITIGATION WITH COMPONENT REPOSITIONING FOR HIGHER POWER SUBSCRIPTION IN WAREHOUSE SCALE COMPUTERS

BACKGROUND

Data centers use three-phase AC power to distribute power on the data floor in order to minimize power losses. Current imbalance, also referred to as load imbalance or phase imbalance, occurs when the loads are drawn from the different phases unequally. This normally happens as a result of uneven component placement across phases. When rectifiers are not equally spread across phases, or when machines are not equally spread across phases, current imbalance is observed.

An imbalance in current can strand power because circuit breakers operate per phase, and one circuit breaker will observe higher load than what they would if load was balanced. This is very costly in terms of additional capital expenses in infrastructure to accommodate the same compute capacity.

BRIEF SUMMARY

The present disclosure provides for detecting current imbalance and reactively moving components, such as rectifiers, machines, etc., from the most loaded phase to the least loaded phase. In particular, imbalance is detected at one or more power distribution units (PDUs). When an imbalance is detected, a hierarchy for rebalancing is built. For example, all components that receive power from the PDU that detected an imbalance are identified. Such identification may include an identification of particular buses, racks, rectifiers, etc. and the hierarchical relationship between such components. Rebalancing may be performed using an optimization algorithm, such as linear programming or mixed integer programming. The model may preserve the number of components per rack, while limiting per-rack phase imbalance and minimizing imbalance among phases. Once the rebalancing has been computed, instructions for moving components according to the rebalancing may be generated. For example, the instructions may be sent to a datacenter operator. Verification that the components were correctly moved may be obtained through rack telemetry.

One aspect of the disclosure provides a method for correcting phase imbalance. The method includes identifying, with one or more processors, an initial configuration of buses, racks, and components associated with a given power distribution unit, identifying, with the one or more processors, current drawn for each phase by each of the components, determining, with the one or more processors, a rebalanced configuration that identifies a number of components that should be assigned to a given phase for one or more racks associated with the given power distribution unit, identifying, with the one or more processors, which components should be moved to achieve the rebalanced configuration and generating, with the one or more processors, instructions for moving the identified components.

According to some examples, the method may further include detecting the current imbalance at a level of the given power distribution unit. Such detecting the current imbalance may include collecting, with the one or more processors, current drawn by the components within each rack associated with the given power distribution unit. Detecting the current imbalance may further include comparing the current drawn by the components in a first phase to the current drawn by the components in a second phase, and/or comparing the current drawn by the components in a first phase to a predetermined threshold.

According to some examples, the components include one of machines or rectifiers.

According to some examples, determining the rebalance configuration includes applying an optimization model, such as a linear programming or mixed integer programming model. The optimization model may preserve a number of the components in each rack, limit per-rack phase imbalance, minimize imbalance among phases, and/or limit a number of components that can be moved to achieve the rebalanced configuration from the initial configuration.

According to some examples, the method further includes transmitting the generated instructions to one or more automated devices configured to move the identified components in response to the instructions.

According to some examples, the method further includes verifying, through rack telemetry, that the identified components were moved in accordance with the generated instructions.

Another aspect of the disclosure provides a system for correcting phase imbalance, the system including one or more processors in communication with a given power distribution unit, the given power distribution unit having one or more buses, racks, and components associated therewith in an initial configuration. The one or more processors may be configured to identify current drawn for each phase by each of the components, determine a rebalanced configuration that identifies a number of components that should be assigned to a given phase for one or more racks associated with the given power distribution unit, identify which components should be moved to achieve the rebalanced configuration, generate instructions for moving the identified components. The components include, for example, one of machines or rectifiers.

According to some examples, determining the rebalance configuration includes applying an optimization model, such as a linear programming or mixed integer programming model. The optimization model may preserve a number of the components in each rack, limit per-rack phase imbalance, minimize imbalance among phases, and/or limit a number of components that can be moved to achieve the rebalanced configuration from the initial configuration.

According to some examples, the one or more processors are further configured to transmit the generated instructions to one or more automated devices configured to move the identified components in response to the instructions.

Yet another aspect of the disclosure provides a non-transitory computer-readable medium storing instructions executable by one or more processors for performing a method for correcting phase imbalance. The method may include identifying an initial configuration of buses, racks, and components associated with a given power distribution unit, identifying current drawn for each phase by each of the components, determining a rebalanced configuration that identifies a number of components that should be assigned to a given phase for one or more racks associated with the given power distribution unit, identifying which components should be moved to achieve the rebalanced configuration, and generating instructions for moving the identified components.

BRIEF DESCRIPTION OF THE DRAWINGS

FIGS. 2A-B are schematic diagrams illustrating example datacenters according to aspects of the disclosure.

DETAILED DESCRIPTION

Figure 1:
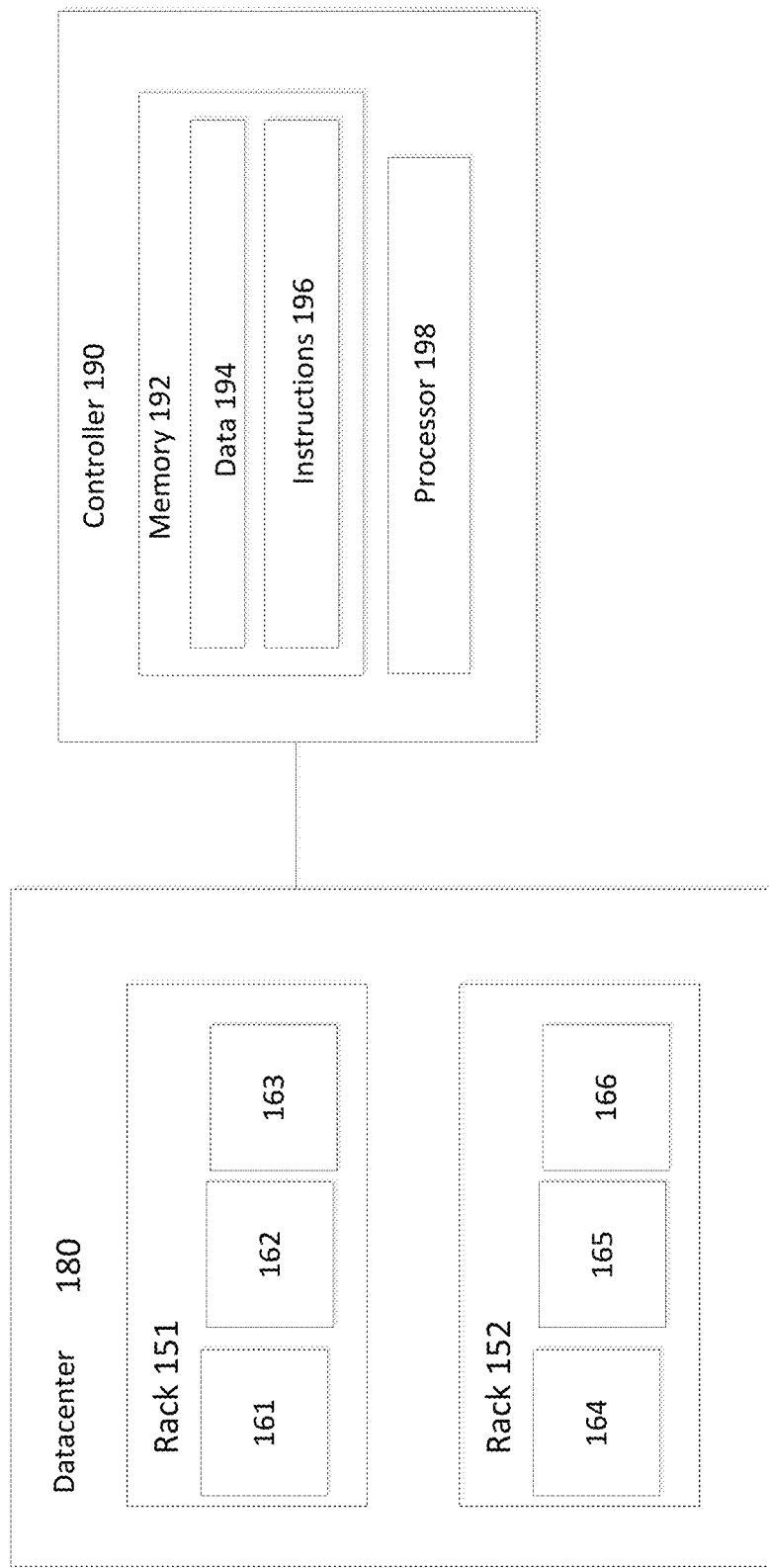
FIG. 1 is a block diagram of an example system according to aspects of the disclosure.

FIG. 1 illustrates an example system including a computing device, such as controller 190, on which the system may be implemented. The controller 190 may include hardware configured to detect current imbalance and rebalance components in datacenter 180. According to one example, the controller 190 may reside within and control a particular datacenter. According to other examples, the controller 190 may be coupled to one or more datacenters 180, such as through a network, and may manage operations of multiple datacenters.

Figure 2B:
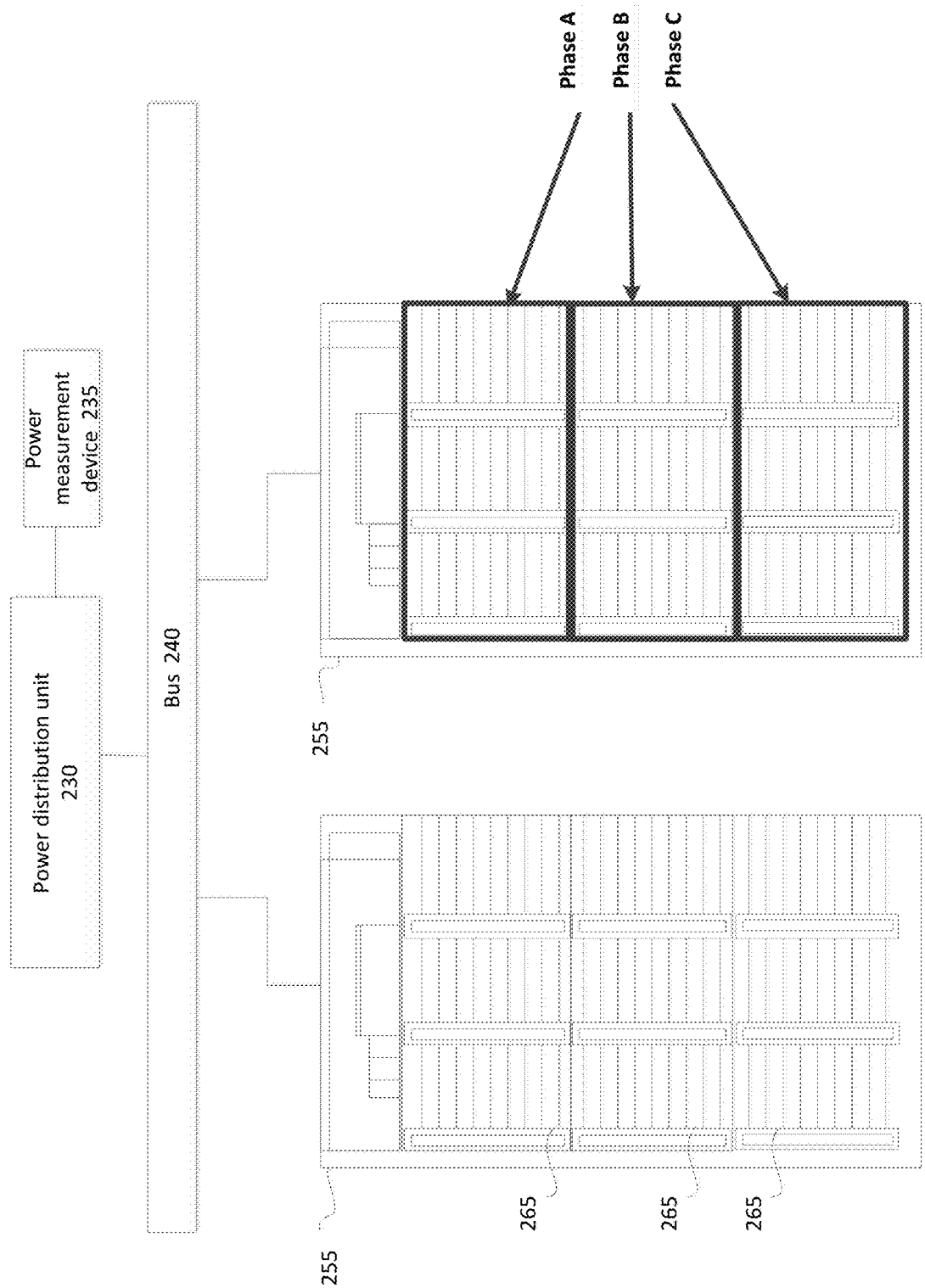

The datacenter 180 may be positioned a considerable distance from the controller 190 and/or other datacenters (not shown). The datacenter 180 may include one or more computing devices, such as processors, servers, shards, cells, or the like. For example, one or more racks 151, 152 may be coupled to a bus, each rack 151, 152 including a plurality of components 161-166, such as servers. FIGS. 2A-B illustrate examples of datacenter computing devices in more detail. In some examples, the computing devices in the datacenter may have different capacities. For example, the different computing devices may have different processing speeds, workloads, etc. While only a few of these racks 151, 152 and computing devices 161-166 are shown, it should be understood that each datacenter 180 may include any number of computing devices, and that the number of computing devices in a first datacenter may differ from a number of computing devices in a second datacenter. Similarly, the number of computing devices in each rack may differ. Moreover, it should be understood that the number of computing devices 161-166 and racks 151, 152 in each datacenter 180 may vary over time, for example, as hardware is removed, replaced, upgraded, or expanded.

In some examples, the controller 190 may communicate with the computing devices in the datacenter 180, and may facilitate the execution of programs. For example, the controller 190 may track the capacity, status, workload, or other information of each computing device, and use such information to assign tasks. The controller 190 may include a processor 198 and memory 192, including data 194 and instructions 196. In other examples, such operations may be performed by one or more of the computing devices in the datacenter 180, and an independent controller may be omitted from the system.

The controller 190 may contain a processor 198, memory 192, and other components typically present in server computing devices. The memory 192 can store information accessible by the processor 198, including instructions 196 that can be executed by the processor 198. Memory can also include data 194 that can be retrieved, manipulated or stored by the processor 198. The memory 192 may be a type of non-transitory computer readable medium capable of storing information accessible by the processor 198, such as a hard-drive, solid state drive, tape drive, optical storage, memory card, ROM, RAM, DVD, CD-ROM, write-capable, and read-only memories. The processor 198 can be a well-known processor or other lesser-known types of processors. Alternatively, the processor 198 can be a dedicated controller such as an ASIC.

The instructions 196 can be a set of instructions executed directly, such as machine code, or indirectly, such as scripts, by the processor 198. In this regard, the terms "instructions," "steps" and "programs" can be used interchangeably herein. The instructions 196 can be stored in object code format for direct processing by the processor 198, or other types of computer language including scripts or collections of independent source code modules that are interpreted on demand or compiled in advance.

The data 194 can be retrieved, stored or modified by the processor 198 in accordance with the instructions 196. For instance, although the system and method is not limited by a particular data structure, the data 194 can be stored in computer registers, in a relational database as a table having a plurality of different fields and records, or XML documents. The data 194 can also be formatted in a computer-readable format such as, but not limited to, binary values, ASCII or Unicode. Moreover, the data 194 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 198 and memory 192 as being within the same block, the processor 198 and memory 192 may actually include multiple processors and memories that may or may not be stored within the same physical housing. For example, some of the instructions 196 and data 194 can be stored on a removable CD-ROM and others within a read-only computer chip. Some or all of the instructions and data can be stored in a location physically remote from, yet still accessible by, the processor 198. Similarly, the processor 198 can actually include a collection of processors, which may or may not operate in parallel.

FIG. 2A provides one example of a datacenter, including a plurality of racks 250 of a first type. For example, such racks 250 of the first type may be used by hyperscale providers. Each rack includes a plurality of machines 260, such as servers or other processing devices. Additionally, each rack 250 includes a plurality of rectifiers 270 deployed across different phases. For example, the rectifiers 270 may be deployed across Phase A, B, and C. The rectifiers 270 rectify AC current into DC current that powers the machines 260. For example, a DC power bus (not shown) may run along a back of the rack and connect the rectifiers 270 to the machines 260.

The rectifiers 270 may receive the AC current from a bus 240, wherein multiple racks 250 may be coupled to the bus 240. While three racks 250 are shown in FIG. 2A, it should be understood that more or fewer racks may be coupled to the bus 240.

The bus 240 receives power from power distribution unit 230, which may be further coupled to a power source (not shown). For example, a power signal delivered to the bus 240 through the power distribution unit 230 may be a three-phase signal. While only one bus 240 is shown connected to the power distribution unit 230, it should be understood that multiple buses may be coupled to each power distribution unit, each bus having a plurality of racks coupled thereto.

Measuring device 235 may be coupled to, or included in, the power distribution unit 230. The measuring device 235 may measure the load placed on the power signal by the equipment in the racks 250. The measuring device 235 may be, for example, a wattage meter, an amp meter, or a voltmeter that measures a voltage across one or more phases of the signal.

FIG. 2B illustrates another example datacenter, including a plurality of racks 255 coupled to bus 240, each rack 255 including a plurality of machines 265. The power distribution unit 230, measuring device 235, and bus 240 may operate similarly as described above in connection with FIG. 2A. In FIG. 2B, the racks 255 may be of a second type. For example, such rack types may be used in smaller data center deployments. Each machine 265 may draw power from a single phase. In this setup the location of the machine in the rack determines the phase from which it draws power. For example, the machines 265 located in an upper portion of the rack may draw power from Phase A, while the machines in the middle portion of the rack draw power from Phase B and the machines in the bottom portion of the rack draw power from Phase C. While only one two racks 255 and one bus 240 are shown in FIG. 2B, it should be understood that additional racks and buses may be coupled to the power distribution unit.

While FIGS. 1, 2A-B illustrate a number of datacenter components, it should be understood that the datacenter may include additional components. For example, the datacenter may further include switches, communication links such as optical link, wiring, or the like, telemetry systems, and/or other components typically found in datacenters. Moreover, while one power distribution unit 230 is shown in each figure, it should be understood that each datacenter may include multiple power distribution units, each having a subset of buses, racks, and components. For example, different power distribution units may service different portions of the datacenter. Each power distribution unit may be coupled to one or more processors or computing devices, such as the controller 190 of FIG. 1, for detecting and measuring and correcting current imbalance.

In either of the deployments of FIGS. 2A-B, or other example deployments, current imbalances may be detected and components may be reactively moved to rebalance current. For example, current imbalances may be detected at the level of the power distribution units. For example, telemetry for power domains of interest, such as selected power distribution units and their subsets of components, may be collected. The collected telemetry may be used to estimate current imbalance, such as by using the formula:

$$\text{Imbalace} = \max\left(\frac{|I_A - I_{avg}|}{I_{avg}}, \frac{|I_B - I_{avg}|}{I_{avg}}, \frac{|I_C - I_{avg}|}{I_{avg}}\right)$$

where $I_A$ is the current drawn from Phase A, $I_B$ is the current drawn from Phase B, $I_C$ is the current drawn from Phase C, and $I_{avg}$ is the average current of each phase. Power subscription, such as a portion of power that is deployed, may also be determined as the sum of max power of machines, network gear, cooling equipment and miscellaneous loads. This calculation may include estimates of inefficiencies and losses as well as safety margins.

Based on the estimated current imbalance and power subscription, one or more power distribution units may be selected for rebalancing. For example, if the current imbalance and/or power distribution for a particular power distribution unit exceeds a predetermined threshold, the particular power distribution unit may be selected for rebalancing. According to some examples, the power distribution units may be sorted and prioritized based on the current imbalance and power distribution, such that the power distribution units with the greatest imbalance are selected for rebalancing ahead of other units where the imbalance may be less impactful. Addressing higher power subscription and current imbalance first may reduce a risk of tripping a breaker.

Once imbalanced power distribution units are detected, a hierarchy for rebalancing may be built. For example, for a given power distribution unit, all children power nodes may be identified. Such power nodes may correspond to rows of machines or buses. For each bus, each of its racks may be identified. Telemetry data for each rack may be obtained. According to some examples, verification may be performed, such as to check validity of rectifiers, machine serial numbers, etc. These safety checks verify that all the data is consistent with all of the other data. For example, data may be received from a number of sources, such as from redundant power meters and from meters at different levels of the hierarchy, and the data from those different sources should agree. As another example, serial numbers may be obtained through telemetry, from databases, and/or from manual barcode scans on the equipment, etc. The serial numbers from each of these sources should match.

Each rack with consistent data that has been verified has its number of rectifiers per phase and current per phase. For racks with inconsistent data, at least the current per phase is obtained, but they are not selected during the rebalancing step. Such racks may be ignored for rebalancing, but the inconsistent data can be used by other monitoring systems, such as to help identify broken equipment or bad data stored in databases.

Figure 3:
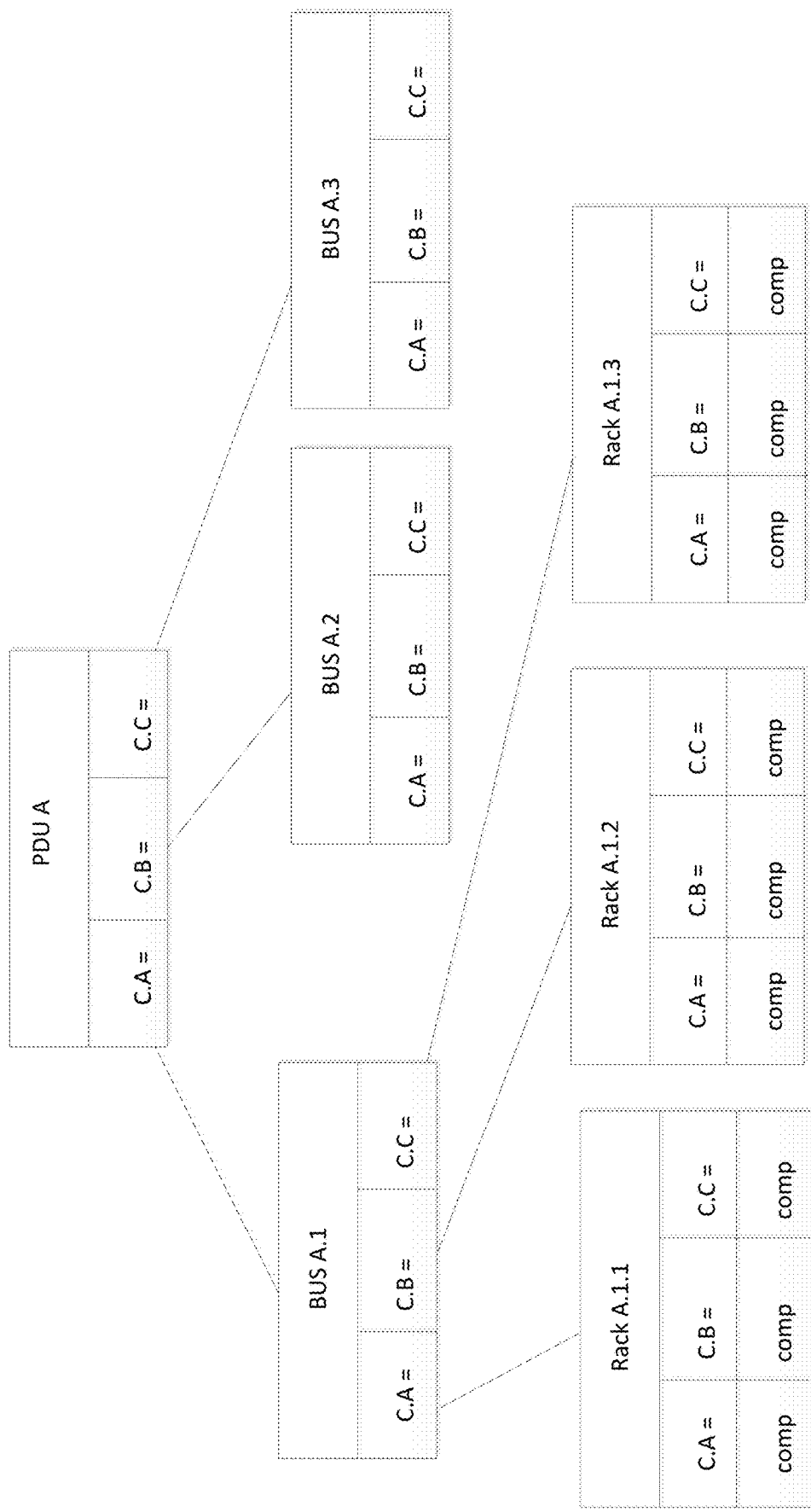
FIG. 3 illustrates an example hierarchy for current rebalancing according to aspects of the disclosure.

FIG. 3 illustrates an example hierarchy built for the given power distribution unit that was selected for rebalancing. At a highest level of the hierarchy shown, power distribution unit (PDU) A is identified, with all buses under its domain shown in a second level of the hierarchy. As shown, such buses include Bus A.1, Bus A.2, and Bus A.3. For each bus, the corresponding racks are identified. While only Racks A.1.1, A.1.2, and A.1.3 corresponding to Bus A.1 are shown in a lowest level of the hierarchy, it should be understood that racks corresponding to Bus A.2 and Bus A.3 may also be identified and provided in the hierarchy.

For the PDU A, each Bus, and each Rack, the current in each phase ($C_A$, $C_B$, $C_C$) may be identified in the hierarchy. While FIG. 3 does not provide example values for the current in each phase for each PSU, Bus, and Rack, the hierarchy may include values based on the detected telemetry. The hierarchy may also identify a number of components in each phase of each Rack. For example, as shown in FIG. 3, the "comp" for each phase of current ($C_A$, $C_B$, $C_C$) may identify the number of components in that phase.

Component rebalancing may be performed using an optimization model such as mixed integer programming to optimize components. It could accomplish this by creating an optimization model for each Bus in the hierarchy. The model may be created to determine how many components, such as rectifiers or machines, should be allocated to each phase for each rack. In creating the optimization model, model variables may be identified. The model may preserve a number of components per rack, limit per-rack phase imbalance, minimize imbalance among phases, and minimize a number of rectifier moves.

A variable may be defined for each rack and phase. The value may range from 0 to the maximum number of components allowed in a given phase. For example, some racks may allow up to 4 components per phase, while other may allow up to 5 components per phase, etc. By way of example, for a rack r1, 3 variables may be defined as:

0 ≤ r1_A_num_components ≤ x

0 ≤ r1_B_num_components ≤ x

0 ≤ r1_C_num_components ≤ x

In the above definitions, 0 and x are constant values, with x representing the maximum number of components per phase. The other values are model variables.

In preserving the number of components per rack, components may only be moved within a rack, as opposed to being ignored, powered off, moved to a different rack, etc. This constraint in the model may be expressed as:

r1_A_num_components+r1_B_num_components+ r1_C_num_components=y

Racks can move around within clusters or between clusters over their lifetime. Per-rack phase imbalance may be limited to ensure that individual racks do not become more imbalanced than necessary. This may be accomplished by restricting the difference in the number of components per phase to be at most one in each rack:

−1 ≤ r1_A_num_compoenents−r1_B_num_components ≤ 1

−1 ≤ r1_B_num_components−r1_C_num_components ≤ 1

−1 ≤ r1_C_num_components−r1_A_num_components ≤ 1

In minimizing imbalance among phases, the average current per components in a given rack can be used to construct the total current per phase at the bus level. For example:

bus_A_current=avg_current_r1*r1_A_num_components+ avg_current_r2*r2_A_num_components+ . . . .

bus_B_current=avg_current_r1*r1_B_num_components+ avg_current_r2*r2_B_num_components+ . . . .

bus_C_current=avg_current_r1*r1_C_num_components+ avg_current_r2*r2_C_num_components+ . . . .

Minimizing the imbalance among phases may include minimizing the absolute difference among the phases. Moreover, this may be combined with minimizing the number of rectifier moves. Accordingly, the minimized imbalance may be normalized by dividing it by the total current, and multiplied by a weight:

Normalized, weighted, minimized imbalance=weight*|bus current A−bus current B|+|bus current A−bus current C|+|bus current B−bus current C| / Total current Balancing components at the bus level also reduces phase imbalance at the PDU level. In a case where miscellaneous single-phase loads are present at the PDU level which must be compensated, a second term can be added based on pdu_current and the weight factors can be used to choose which the level at which to optimize.

The initial number of rectifiers on each phase is known. The model may penalize changes to this initial state in order to minimize the number of rectifier moves. The number of changes may be computed as follows:

r1_A_change=|r1_A_num_components− r1_A_initial_num_components|

The minimized number of rectifier changes may also be normalized by dividing it by the total number of rectifiers and applying a weight.

Normalized, weighted, minimized # of rectifier changes=weight*r1 A change+r1 B change+r1 C change+r2 A change+r2 B change+ . . . / Total number of components The model may output a combination of the minimized imbalance and the minimized number of rectifier changes. While the solution to this model indicates the number of rectifiers on a given phase for a given rack, all racks may be compared against the initial state to detect the changes that will be instructed. According to some examples, transformations may be applied to the model before implementing it, for example for the values to be supported in linear models.

For each rectifier move identified as an output of the model, instructions may be generated for moving the rectifier. For example, instructions may be generated for a local data center operator to perform the move, such as by prescribing the pre-move position of the component to be moved as well as the post-move position. The instructions may be transmitted to the data center operator as a problem report. For example, the datacenter operator may be a human that reads the problem report, and physically moves the identified component according to the instructions. In other examples, the movement of the component may be automated. For example, the instructions may be sent as one or more commands to a processor of a robotic datacenter device, wherein the robotic device includes an end effector that may physically move the identified component according to the instructions.

The post-move position may be verified through electronic detection of the component position. For example, the post-move position may be collected through rack telemetry to verify that the move took place without error.

Figure 4:
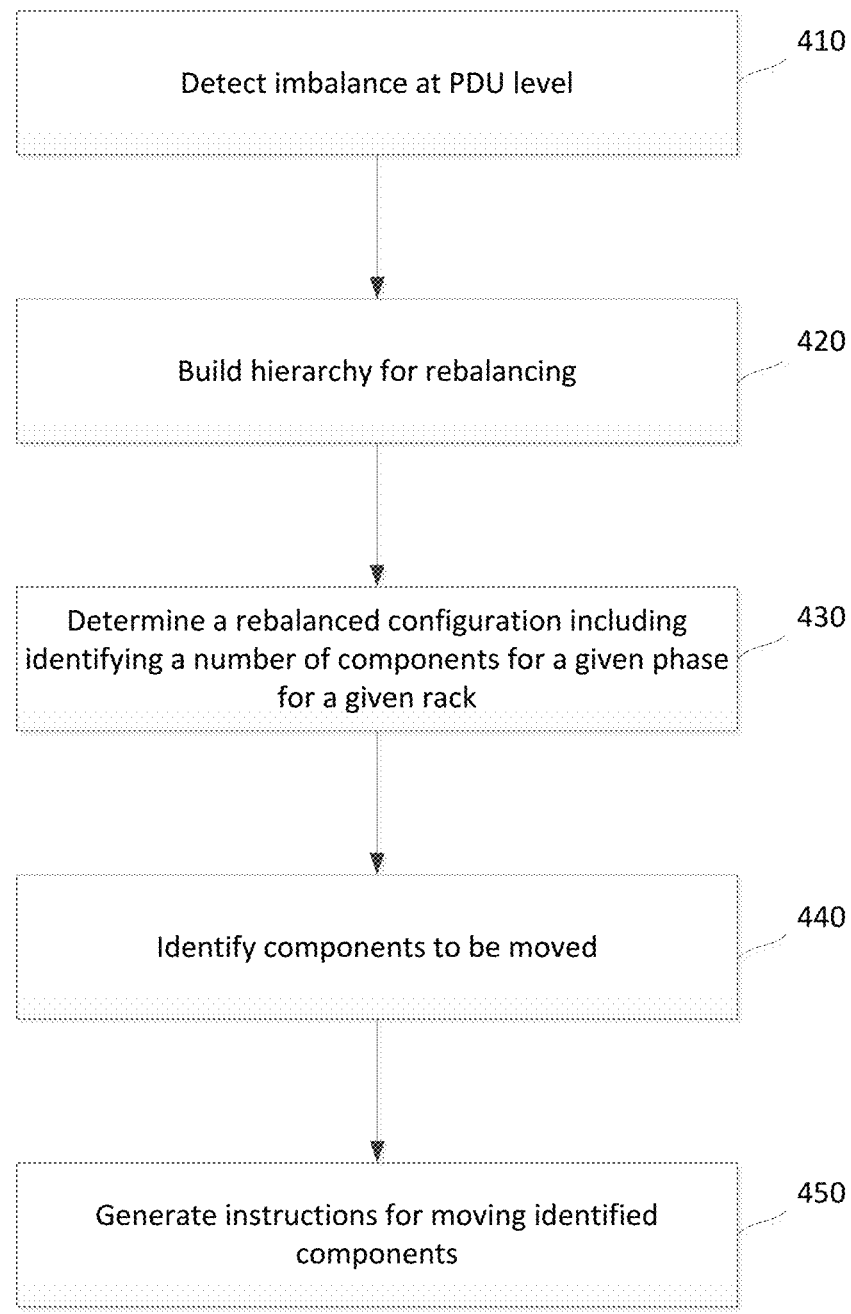
FIG. 4 is a flow diagram illustrating a method of current rebalancing according to aspects of the disclosure.
Figure 5:
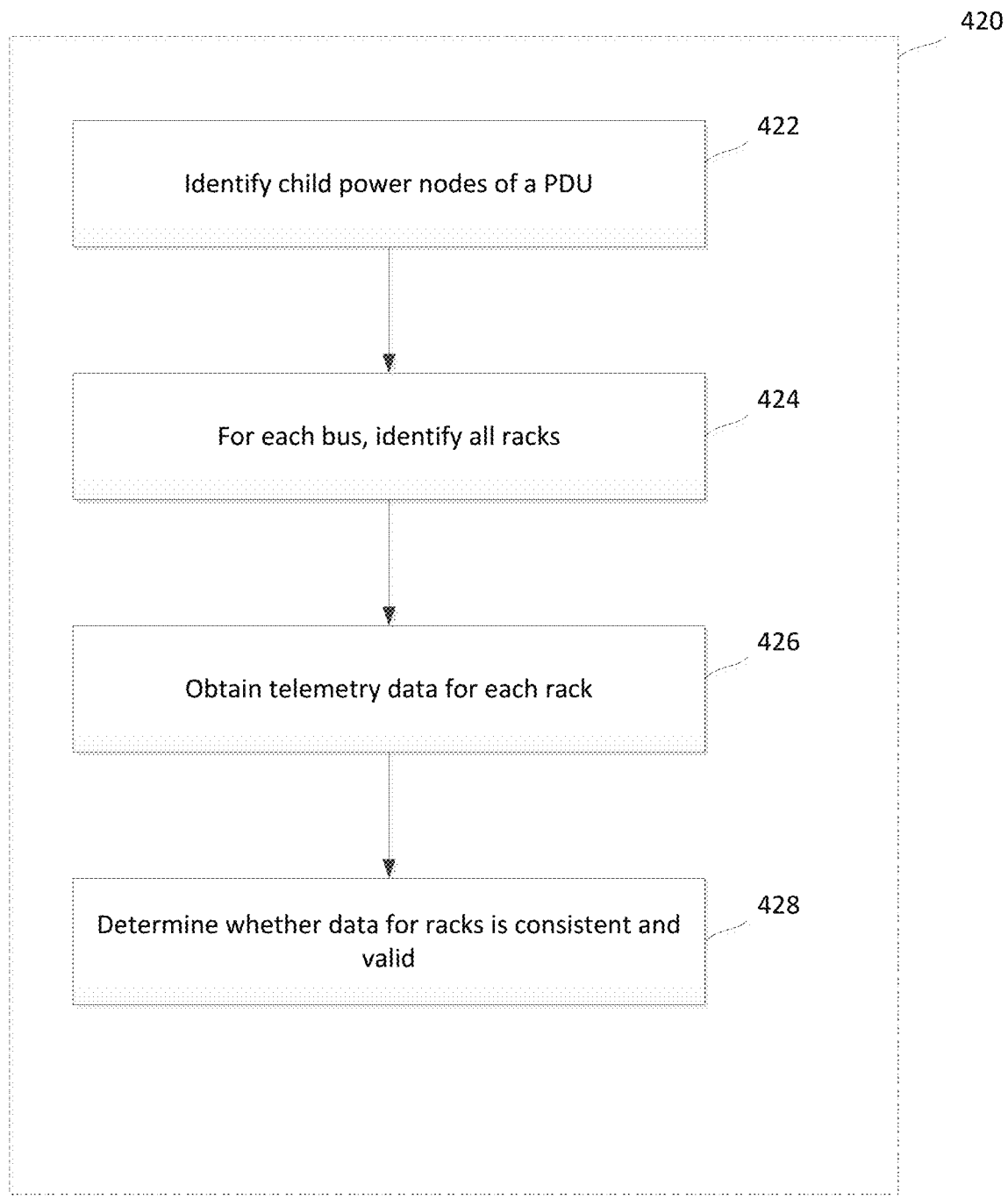
FIG. 5 is a flow diagram illustrating a method of building a hierarchy for rebalancing according to aspects of the disclosure.
Figure 6:
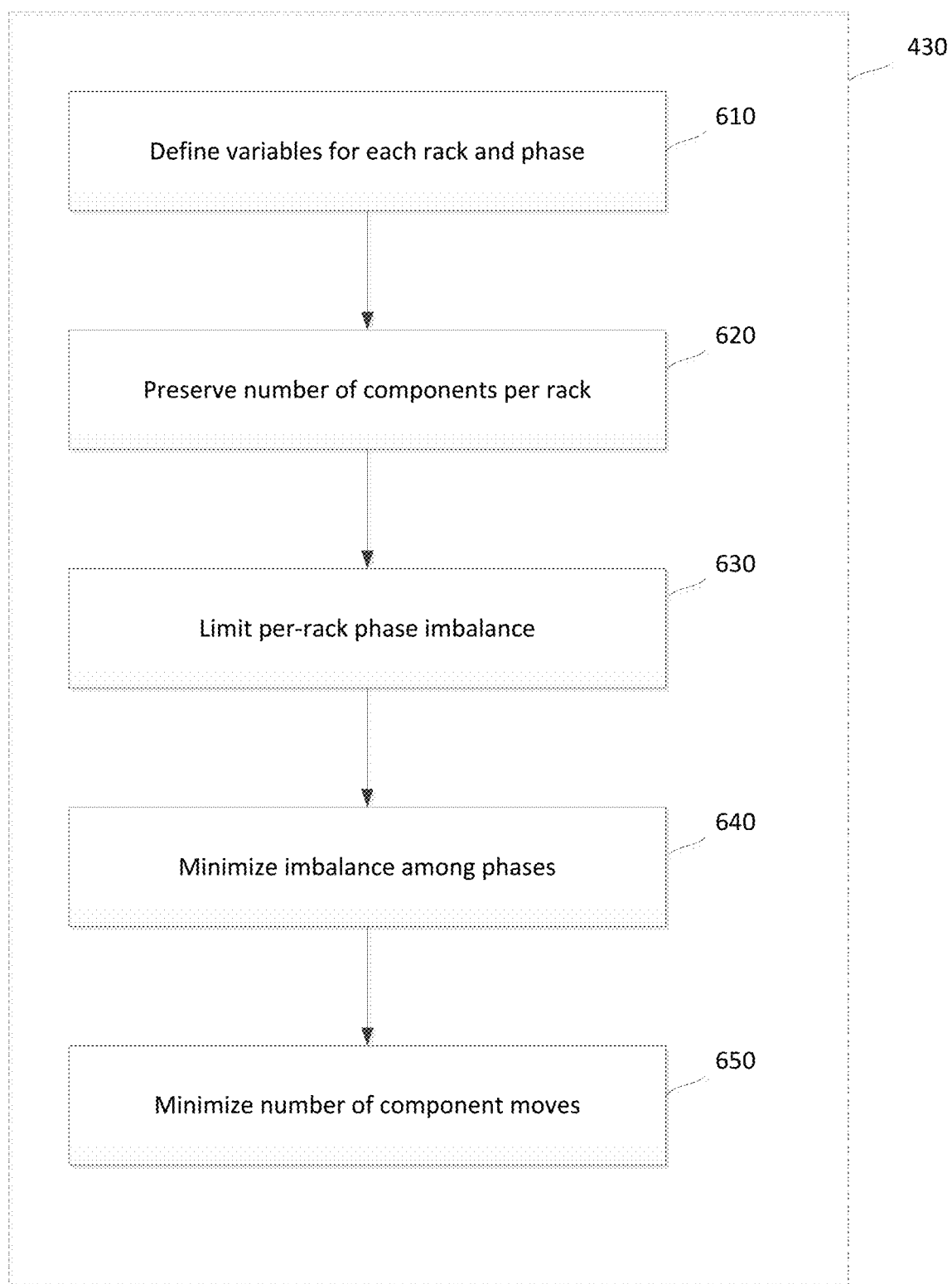
FIG. 6 is a flow diagram illustrating a method of determining a rebalanced configuration according to aspects of the disclosure.

FIG. 4 illustrates a method 400 of detecting and correcting current imbalance in a datacenter, while FIGS. 5-6 illustrate further details of particular blocks of FIG. 4. While each of FIGS. 4-6 and the accompanying description may describe operations in a particular order, it should be understood that the order may be modified or operations may be performed simultaneously. Moreover, operations may be omitted or added.

In block 410, phase imbalance is detected at the power distribution unit level. For example, current drawn for each phase may be detected by the power distribution unit, a measurement device connected to or integrated with the power distribution unit, a controller coupled to the power distribution unit, and/or other devices. According to some examples, current drawn by components within a rack associated with the power distribution unit may be reported using rack telemetry. The current drawn by each phase may be compared to determine whether any phase is too high or low relative to the others. For example, the current for a given phase may be too high if it is greater than any other phase by a threshold percentage or value. According to some examples, phase imbalance may be detected based on power subscription in combination with current imbalance.

In block 420, a hierarchy for phase rebalancing may be built. For example, as illustrated in FIG. 5, building the hierarchy may include identifying child power nodes for a given power distribution unit (block 422). The child nodes may include all buses that receive power through the given power distribution unit. For each bus, all racks may be identified (block 424). In block 426, telemetry data for each rack may be obtained. For example, the telemetry data may be used to indicate a location and identification of machines or rectifiers on a rack, racks on a bus, and current drawn by each machine or rectifier, rack, and bus. In block 428, it is determined whether the telemetry data for each rack is consistent and valid. For each rack with consistent data, the resulting hierarchy may indicate its number of components, such as rectifiers or machines, per phase and current per phase.

Returning to FIG. 4, in block 430 a rebalanced configuration is determined, the rebalanced configuration identifying a number of components, such as rectifiers or machines, that should be allocated to a given phase for a given rack. FIG. 6 illustrates an example of how the rebalanced configuration may be determined using a mixed integer programming model for each bus in the hierarchy. In block 430, model variables are defined for each rack and phase. For example, a value for the variable may range from 0 to the maximum number of components allowed in a given phase.

In block 620, the number of components per rack are preserved. For example, while components may be moved within a rack, the components will not be omitted, powered off, moved to a different rack, etc. Accordingly, if a rack initially has three rectifiers, the rebalanced model will also have 3 rectifiers.

In block 630, per-rack phase imbalance is limited. For example, the difference between the number of components per phase in an initial, unbalanced model and the number of components per phase in a resulting rebalanced model may be limited. According to some examples, at most one component in each rack can be move. In other examples, the limit to the number of components in each rack that can be moved can be higher, such as 2 components, 3 components, etc.

In block 640, imbalance among phases is minimized. For example, the average current per components in a given rack can be used to construct the total current per phase at the bus level. In some examples, minimizing the imbalance among phases may include minimizing the absolute difference among the phases.

In block 650, the number of rectifier moves may be minimized. For example, the initial number of rectifiers on each phase is known. The model may penalize changes to this initial state in order to minimize the number of rectifier moves.

The model may output a combination of the minimized imbalance and the minimized number of rectifier changes. While the solution to this model indicates the number of rectifiers on a given phase for a given rack, all racks may be compared against the initial state to detect the changes that will be instructed.

Returning to FIG. 4, in block 440 each component to be moved to achieve the rebalanced configuration may be identified. For example, particular rectifiers or machines to be moved may be identified. The components may be identified by location, serial number, node identifiers, and/or any other types of information for identifying components.

In block 450, for each component move identified as an output of the model, instructions may be generated for moving the component. For example, instructions may be generated for a local data center operator to perform the move, such as by prescribing the pre-move position of the component to be moved as well as the post-move position.

According to some examples, it may be verified that the component was correctly moved. For example, the post-move position may be verified through electronic detection of the component position, collected through rack telemetry.

The system and method described above are advantageous in that vast amounts of power can be saved by rebalancing current. Accordingly, datacenters can run more efficiently. Moreover, by rebalancing current, there is a reduced risk of tripping a breaker as a result of high current in a given phase. As such, a likelihood of down time for machines and failure of particular tasks is reduced by reducing the likelihood of outages.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for correcting phase imbalance, comprising:
identifying, with one or more processors, an initial configuration of buses, racks, and components associated with a given power distribution unit;
identifying, with the one or more processors, current drawn for each phase by each of the components;
determining, with the one or more processors, a rebalanced configuration that identifies a number of components that should be assigned to a given phase for one or more racks associated with the given power distribution unit;
identifying, with the one or more processors, which components should be moved to achieve the rebalanced configuration; and
generating, with the one or more processors, instructions for moving the identified components.

2. The method of claim 1, further comprising detecting the current imbalance at a level of the given power distribution unit.

3. The method of claim 2, wherein detecting the current imbalance comprising collecting, with the one or more processors, current drawn by the components within each rack associated with the given power distribution unit.

4. The method of claim 3, wherein detecting the current imbalance further comprises comparing the current drawn by the components in a first phase to the current drawn by the components in a second phase.

5. The method of claim 3, wherein detecting the current imbalance further comprises comparing the current drawn by the components in a first phase to a predetermined threshold.

6. The method of claim 1, wherein the components include one of machines or rectifiers.

7. The method of claim 1, wherein determining the rebalance configuration comprises applying an optimization model.

8. The method of claim 7, wherein the optimization model preserves a number of the components in each rack.

9. The method of claim 7, wherein the optimization model limits per-rack phase imbalance.

10. The method of claim 7, wherein the optimization model minimizes imbalance among phases.

11. The method of claim 7, wherein the optimization model limits a number of components that can be moved to achieve the rebalanced configuration from the initial configuration.

12. The method of claim 1, further comprising transmitting the generated instructions to one or more automated devices configured to move the identified components in response to the instructions.

13. The method of claim 1, further comprising verifying, through rack telemetry, that the identified components were moved in accordance with the generated instructions.

14. A system for correcting phase imbalance, comprising:
one or more processors in communication with a given power distribution unit, the given power distribution unit having one or more buses, racks, and components associated therewith in an initial configuration, the one or more processors configured to:
identify current drawn for each phase by each of the components;
determine a rebalanced configuration that identifies a number of components that should be assigned to a given phase for one or more racks associated with the given power distribution unit;
identify which components should be moved to achieve the rebalanced configuration; and
generate instructions for moving the identified components.

15. The system of claim 14, wherein the components include one of machines or rectifiers.

16. The system of claim 14, wherein determining the rebalance configuration comprises applying an optimization model.

17. The system of claim 16, wherein the optimization model preserves a number of the components in each rack and limits per-rack phase imbalance.

18. The system of claim 17, wherein the optimization model minimizes imbalance among phases and limits a number of components that can be moved to achieve the rebalanced configuration from the initial configuration.

19. The system of claim 14, wherein the one or more processors are further configured to transmit the generated instructions to one or more automated devices configured to move the identified components in response to the instructions.

20. A non-transitory computer-readable medium storing instructions executable by one or more processors for performing a method for correcting phase imbalance, comprising:
identifying an initial configuration of buses, racks, and components associated with a given power distribution unit;
identifying current drawn for each phase by each of the components;
determining a rebalanced configuration that identifies a number of components that should be assigned to a given phase for one or more racks associated with the given power distribution unit;
identifying which components should be moved to achieve the rebalanced configuration; and
generating instructions for moving the identified components.

* * * * *